United States Patent [19]

Nevrekar

[11] Patent Number: 5,236,345
[45] Date of Patent: Aug. 17, 1993

[54] EXPANDING GATE VALVE ASSEMBLY

[76] Inventor: Venkatesh R. Nevrekar, 6 Castle Creek Pl., Shawnee, Okla. 74801

[21] Appl. No.: 833,958

[22] Filed: Feb. 11, 1992

[51] Int. Cl.⁵ ............................................. F16K 3/12
[52] U.S. Cl. .................................... 251/197; 251/193
[58] Field of Search ............... 251/193, 195, 196, 197, 251/199, 204

[56] References Cited

U.S. PATENT DOCUMENTS

| | | | |
|---|---|---|---|
| 556,006 | 3/1896 | Fletcher . | |
| 750,128 | 1/1904 | Schneider . | |
| 880,674 | 3/1908 | Ladd . | |
| 1,512,431 | 10/1924 | Trowe . | |
| 3,125,323 | 3/1964 | Heinen | 251/197 |
| 3,823,911 | 7/1974 | Natho et al. | 251/167 |
| 4,179,099 | 12/1979 | Pierce, Jr. | 251/168 |
| 4,188,014 | 2/1980 | Alvarez | 251/196 |
| 4,188,016 | 2/1980 | Whaley | 251/328 |
| 4,189,127 | 2/1980 | Constantino | 251/196 |
| 4,279,404 | 7/1981 | Levin | 251/167 |
| 4,291,862 | 9/1981 | Alvarez et al. | 257/167 |
| 4,334,666 | 6/1982 | Alvarez et al. | 251/167 |
| 4,341,369 | 7/1982 | Meyer | 251/168 |
| 4,405,113 | 9/1983 | Erwin | 251/326 X |
| 4,530,488 | 7/1985 | Kemp | 251/167 |
| 4,531,710 | 7/1985 | Tort | 251/167 |

FOREIGN PATENT DOCUMENTS 478810 11/1951 Canada .

Primary Examiner—John C. Fox
Attorney, Agent, or Firm—Bill D. McCarthy

[57] ABSTRACT

An expanding gate valve assembly comprising a gate, a stem for actuating the gate and floating segments movably mounted on opposite sides of the gate for movement relative to valve seats on a valve body. The valve seats on the valve body are inclined to the axis of the stem, and the segments are provided with correspondingly matching inclined surfaces. Movement of the segments is arrested by stops on the valve body, thereby making the segments expand laterally during closure The gate has a lower gate part having a through conduit which is alignable with a fluid flow passageway in the valve body in the open position, such lower gate part having tapered surfaces parallel to the incline of the valve seats to seal therewith and establish fluid tight communication between the through conduit of the gate and the fluid flow passageway.

6 Claims, 3 Drawing Sheets

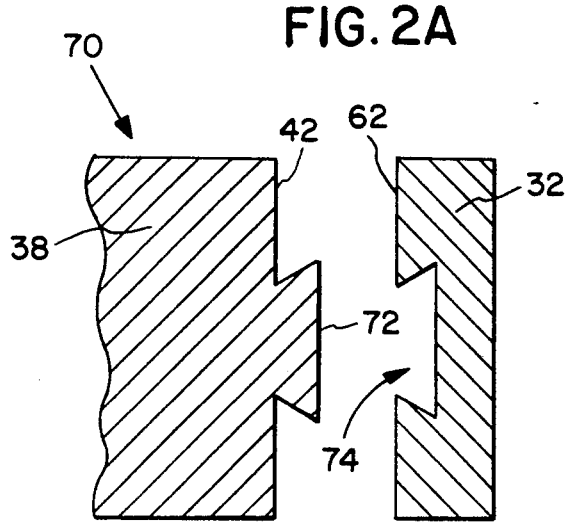
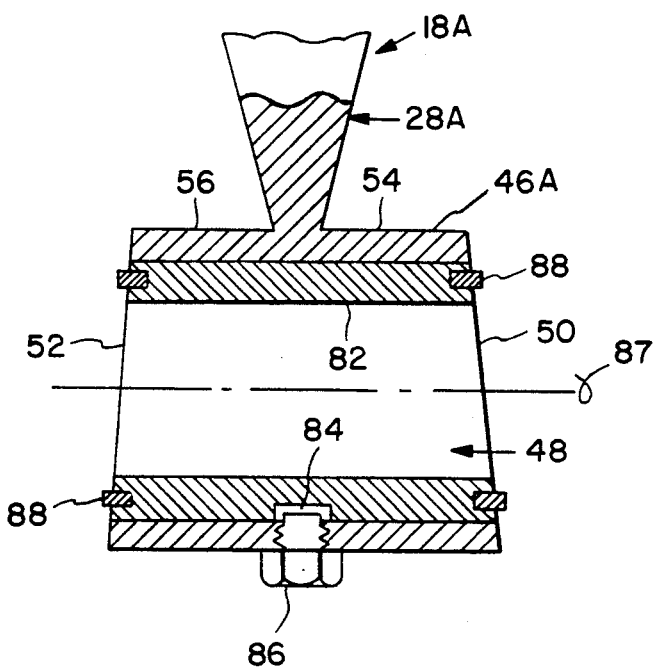
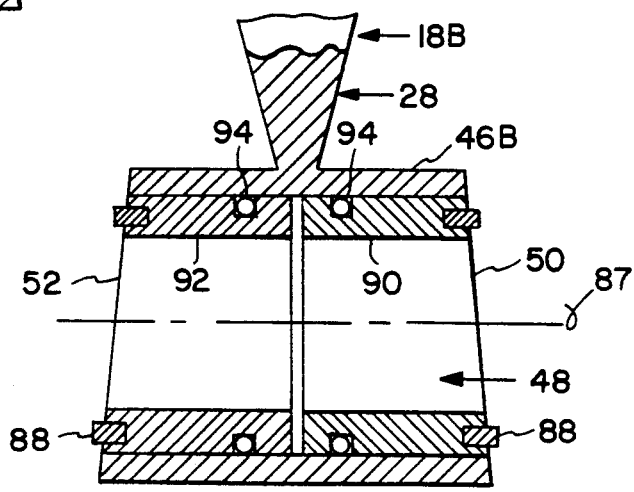

EXPANDING GATE VALVE ASSEMBLY

BACKGROUND OF THE INVENTION

1. Field of the Invention

This invention relates generally to gate valves, and more particularly, to a gate valve of the expanding gate type which includes a gate carrying one or more movable segments which move relative to the gate to effect closing and opening of the valve.

2. Brief Description of the Prior Art

Most gate valve assemblies with expanding gates have typically comprised a gate having a female V-surface formed in the upstream side of the gate, and a floating segment mounted on the gate with a complementary male V-surface which engages and coacts with the female V-surface on the gate. Such gate assembly is positioned between two seat surfaces within the valve body, and the gate assembly generally moves in a direction which is perpendicular to the conduit axis and parallel to the seat faces Sealing during opening and closing is effected by the floating segment being wedged outwardly from the gate in a direction perpendicular to the axis of the stem to effect sealing engagement with the seat faces. Such expanding gate valves may have the gate formed integrally with the stem; the gate may be connected to the stem with a floating connection; or the gate may be threadedly connected to the stem.

In an expanding gate valve of the type described, movement of the gate in a direction normal to the conduit axis brings the floating segment into contact with a stop which arrests further movement of the segment with the gate in a direction normal to the conduit axis. This causes the segment to be wedged outwardly so that the segment is brought into sealing contact with the valve seat. Such axial expansion of the segment along the conduit axis results from the wedging action of the cooperating V-surfaces carried on the segment and on the gate.

The wedging action causing axial, expanding movement of the segment occurs in the fully closed or the fully opened position of the valve, and results from predetermined, selectively located fixed stops which are interposed in the path of movement of the segment as it moves with the gate. The stops arrest further movement of the segment in this direction. When the gate is moving between the open and the closed positions, the segment is caused to collapse upon, or nest with, the gate as a result of the complementary interfitting of the engaged V-surfaces.

In order for the valve to be smoothly and easily operable, and to avoid damage to the valve stem or gate, it is necessary that the wedging action of the gate segment occurs in only the open and closed positions, and that the segment remain in the collapsed condition when the gate is moving between the open and closed positions within the valve body. This prevents unnecessary dragging or binding of the gate assembly against the valve seat faces at a time when sealing is not required. Moreover, any pre-expansion of the segment during travel, also referred to as back-wedging, may result in excessive torque applied to the stem to operate the valve, thereby causing the valve assembly to jam, or even causing failure of the stem.

In a gate assembly in which the gate is connected to the stem with a floating connection, for example with a T-head, both the gate and the segment expand axially along the conduit (fluid flow) axis at the time of closure and opening the valve. When the gate is of the non-floating type, however, because of rigid connection between the gate and the stem, only the segment can expand upon closure and opening of the valve. The restraint of the stem prevents the gate from moving axially along the fluid flow axis.

As a result of such stem restraint, a bending moment is created on the stem in the plane encompassing its axis and the conduit axis (i.e., in the direction of fluid flow). This makes the valve more difficult to operate, and presents the possibility of jamming the valve assembly. When the load on the gate and the stem is relieved, the fluid pressure in the conduit, acting on the segment and aided by the centralizing levers or torsion springs that are often employed in expanding gate valves of the type described, forces the segment to nest or collapse into the gate, thus relieving the pressure on the seat faces. The gate assembly can then travel between the position of opening and closing without dragging or binding due to unnecessary contact with the seat faces.

If the fluid pressure in the conduit on the downstream side of the gate assembly (the side opposite the side of the gate which carries the segment), or in the valve body, should build to exert excessive back pressure on the gate, the nesting or collapsing ability of the gate assembly becomes impaired, thereby causing problems as a result of back-wedging or pre-expansion of the segment. As a result of this, the valve becomes very difficult to operate, and in extreme cases, cannot be operated at all.

For the described reasons, the expanding gate valve assembly having a single V-surface on one side of the gate for the accommodation of the V-shaped male protuberance on the segment is a unidirectional assembly, and can be mounted in the valve body for operation in only one direction of fluid flow. That is, the segment must be located on the upstream or high pressure side of the valve gate in order for the gate assembly to function.

Expanding gate valves of the types described, having a gate with a movable segment mounted thereon, are shown in U.S. Pat. No. 4,189,127; U.S. Pat. No. 4,531,710; U.S. Pat. No. 4,179,009; U.S. Pat. No. 4,188,014; U.S. Pat. No. 4,188,016; U.S. Pat. No. 4,279,404; U.S. Pat. No. 4,341,369; U.S. Pat. No. 4,334,666; U.S. Pat. No. 3,823,911 and U.S. Pat. No. 4,530,488.

In substantially all expanding gate valves as such are presently constructed, the angle provided between the V-surface and the axis of the stem (the direction of opening and closing movement of the valve gate) is generally established to be of such magnitude that it aids in the collapse of the segment while at the same time the operating torque is within a practical range. As the magnitude of this angle is decreased, the ease with which the segment collapses into the gate following opening and closing is reduced, but a lower operating torque is required to open or close the valve. Conversely, the larger the angle, the more readily and easily the segment will collapse into the gate following opening and closing of the valve, but a higher operating torque is required in order to open or close the valve. So a compromise is generally made in determining the magnitude of this angle. Even then, expanding gate valves of the type described have problems associated with collapsing the segment If the angle between the V-surface and the stem axis is not of sufficient magnitude to aid in the collapse of the segment, the gate and the segment become jammed together in the valve body, making it extremely difficult to open the valve. Therefore, in many valves, especially of the larger sizes, centralizing levers are used to aid in the collapsing or nesting of the segment. It should be mentioned here that these valves seal only in the closed position and not always in the open position. In case of hazardous fluids, for safety and environmental reasons, sealing is also required in the open position.

The present invention is designed to eliminate man of the drawbacks of expanding gate assemblies currently in use and discussed above.

SUMMARY OF INVENTION

The present invention provides an expanding gate valve assembly having a gate assembly including a gate member, and one or two relatively movable floating segment members mounted thereon, so that the gate assembly can be constructed in either a unidirectional or a bidirectional form. The expanding gate valve assembly of the present invention seals in the closed as well as the open position.

In the present invention, the segment and gate are aided into assuming the collapsed, or nested position, by preventing movement of the segment with the gate when the gate is moved as the valve is opened. This is achieved by providing a taper on the floating segment and a correspondingly matching taper on the valve seat surface. The tapers on the floating segment and the valve seat surface are of such direction as to prevent the movement of the floating segment with the gate when the valve is being opened. That is, when the gate begins to move away from the fluid flow axis to assume its valve open position, the floating segment is pushed back relatively in the opposite direction by the tapered valve seating surface, thus aiding in the collapse of the floating segment. The floating segment moves toward the nesting position with the gate as the gate is moved by the stem from the valve closed position to a valve open position When the gate moves from the valve open position to the valve closed position, a contact stop provided within the valve body limits the extent to which the floating segment can move with the gate. The floating segment then expands to effect lateral expansion of the gate assembly, and consequent sealing of the segment against the tapered valve seat surface at the time of closure of the valve. When the gate moves from the valve closed position to the valve open position, the tapered valve seat surface physically prevents the floating segment from moving with the gate, and thereby the floating segment moves toward the nesting position with the gate.

The lower part of the gate, below the floating segment, can be provided with a conduit bore, and the lower gate part tapered to match the corresponding taper of the valve seat surface. As the floating segment moves with the gate towards the nesting position when the valve is being opened, the lower gate part of the gate is brought in between the valve seat surfaces to seal the fluid flow conduit in the valve open position.

In another embodiment, the through conduit can be made on the lower part of the segment, which is then aligned with the fluid flow passageway in the valve body when the valve is in the open configuration, the lower part of the segment having an inclined or tapered surface matching the corresponding tapered seating surface in the valve body.

The expanding gate valve assembly of the present invention automatically self-adjusts for wear. When the mating seating surfaces, either on the valve body or on the gate assembly, wear out, a minor further movement of the stem, and hence of the gate assembly, brings the seating surfaces on the gate assembly once again into mating alignment with the seating surfaces on the valve body.

This automatic self-adjustment also serves as a fire-safe feature. As the softer sealing rings are worn or compressed due to fire or otherwise, the metal-to-metal seating surfaces come into contact, thereby assuring more reliable fire-safe design.

An object of the present invention is to provide an expanding gate valve in which the segment collapses due to a tapered seating surface on the valve body that is inclined to the direction of movement of the gate.

A further object of the invention is to provide an expanding gate valve that seals in its closed position as well a in its open position.

One other object of the invention is to provide an expanding gate valve where the movable segment has improved positive collapsing ability, and offers less resistance to movement of the gate between the valve open and closed positions.

A yet further object of the invention is to provide an improved gate valve assembly which can be constructed to reduce operating torque by reducing dragging or pre-wedging of the segment due to better collapsing and nesting ability of the segment with the gate.

A further object of the invention is to provide an expanding gate valve having automatic self-adjusting for wear.

A further object of the invention is to provide an expanding gate valve assembly having a fire-safe design.

Another object of the invention is to provide an expanding gate valve having the capability to replace the sealing rings without draining the fluid from the pipeline, and which facilitates in-line valve repair.

An additional object of the invention is to provide an expanding valve assembly which can be made functional in the bidirectional sense, so that fluid flow can occur in either direction of the gate assembly.

Another additional object of the invention is to provide an expanding valve assembly in which sealing is not necessarily dependent on the fluid pressure in the line.

A further object of the invention is to provide an expanding gate valve assembly that seals the fluid flow conduit from the body cavity when the valve is in its open position in order to minimize leakage of hazardous fluids for safety and environmental reasons.

Other objects and advantages of the invention will become apparent as the following detailed description is read in conjunction with the accompanying drawings which illustrate certain preferred embodiments of the invention.

BRIEF DESCRIPTION OF THE DRAWINGS

FIG. 2A is a view taken at 2A—2A in FIG. 2 and shows the tongue and groove connection between the segments and the gate.

FIG. 3 is a partial cutaway side view of an alternative construction of the gate incorporating an insert sleeve in the conduit in the lower gate part.

FIG. 4, similar to FIG. 3, is a partial cutaway side view of another alternative construction of the gate wherein a pair of insert sleeves are provided in the conduit in the lower gate part.

DESCRIPTION

Figure 1:
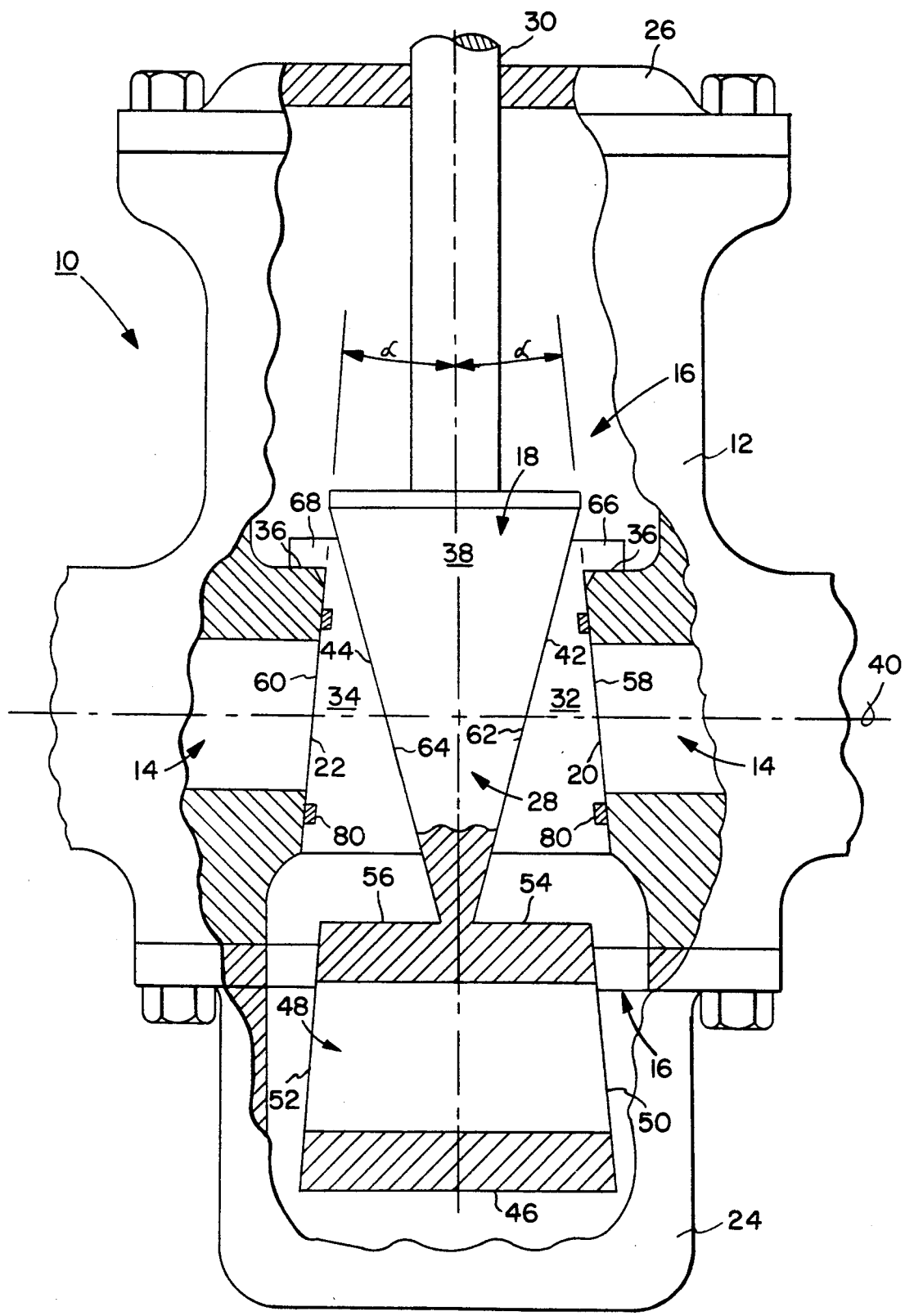
FIG. 1 is a partially detailed, partial cutaway side view of an expanding gate valve assembly constructed in accordance with the present invention, in which the gate carries a floating segment on each side thereof and is depicted in its closed position.
Figure 2:
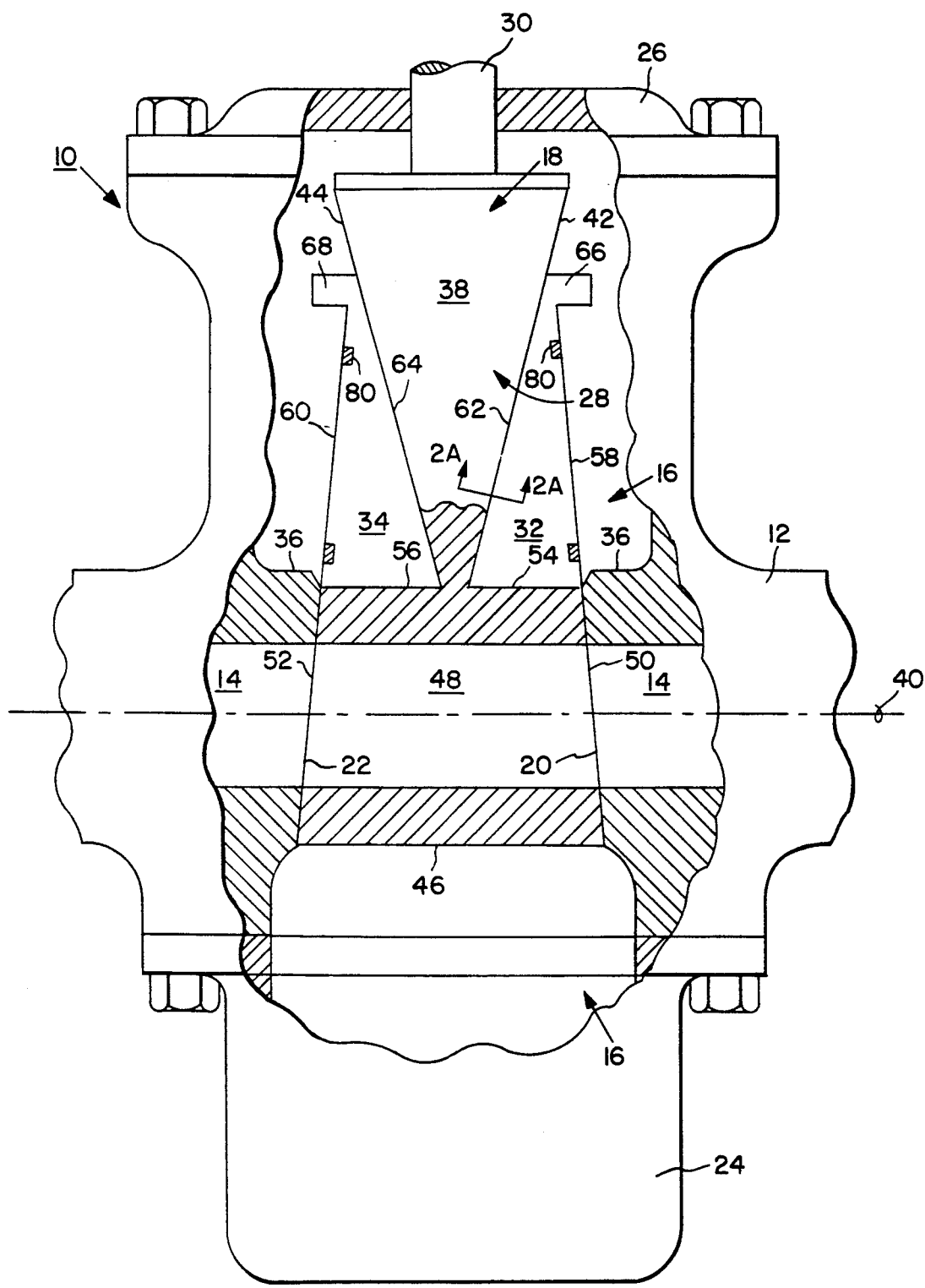
FIG. 2 is a partially detailed, partial cutaway side view of the expanding gate valve assembly of FIG. 1 depicting the valve in its open position.

Referring to the drawings in general, and more specifically to FIGS. 1 and 2, shown therein is an expanding gate valve assembly 10 constructed in accordance with the present invention. The views of FIGS. 1 and 2 are partially detailed and are shown partially cutaway in order to display the internal structure. In the drawings, like numerals will be used throughout to designate like components.

The expanding gate valve assembly 10 has a valve body 12 with a fluid flow passageway 14 extending therethrough and communicating with a central cavity 16 in which is disposed a fluid sealing assembly 18. The valve body 12 has valve seats 20, 22 representing the upstream seat and the downstream seat of the valve body 12. The valve seats 20, 22 generally extend around the fluid flow passageway 14 in an annular configuration, and as shown, are integral parts of the valve body 12. As will be made clear below, the valve seats 20, 22 are inclined, or tapered, and are referred to sometimes hereinbelow as the upstream or first inclined valve seat 20 and the downstream or second inclined valve seat 22.

The valve body 12 has a lower portion 24 which forms a lower portion of the central cavity 16, and attached via a flange/bolting arrangement, a bonnet member 26 forms an upper portion of the central cavity 16. It will be appreciated that instead of, or in addition to, this flange/bolting arrangement, access openings with removable covers (not shown) can be provided in the valve body for access to the sealing rings.

The fluid sealing assembly 18 has a gate 28 to which is attached a stem member 30 which extends through the bonnet member 26 as indicated. A first floating segment 32 and a second floating segment 34 are disposed in juxtaposition to, and on either side of, the gate 28. The portion of the valve body 12 that forms the annular valve seats 20 22 also serves to form stop members 36 as indicted; such stop members 36 function to arrest movement of the floating segments 32, 34 in the manner described below.

The gate 28 has an upper gate part 38 to which the stem member 30 is attached to provide for movement thereof in a direction transverse to axis 40 of the fluid flow passageway 14 through the valve body 12. The upper gate part 38 of the gate 28 has an upstream, wedging-camming face 42 and a downstream, wedging-camming face 44. A lower gate part 46 of the gate 28 has a through conduit or bore 48 which can be aligned with the fluid flow pathway 14 in the valve body 12 when the expanding gate valve assembly 10 is in the open position. The lower gate part 46 has an upstream seating surface 50 and a downstream seating surface 52, and also has segment shoulders 54 and 56.

The first floating segment 32, mounted on the upstream side of the upper gate part 38 of the gate 28, has an upstream surface 58 mating complementarily with upstream valve seat 20 of the valve body 12. The upstream valve seat 20 is inclined so that the plane thereof is inclined to the axis of the stem member 30 at an acute angle $\alpha$. It will be understood that the upstream valve seat 20, while shown and discussed herein as being a flat or planar surface, can also be curvilinear if such is desired for a particular application, and this applies as well to the downstream valve seat 22.

In like manner, the downstream segment 34, mounted on the downstream side of the upper gate part 38 of the gate 28, has a downstream surface 60 mating complementarily with the downstream valve seat 22 of the valve body 12. The downstream valve seat 22 is inclined so that the plane therethrough is inclined to the axis of the stem member 30 at an acute angle $\alpha$ in a direction opposite to the inclination of the upstream valve seat 20. The faces 50 and 52 on the lower gate part 46 of the gate 28 are substantially parallel to the annular valve seats 20 and 22, respectively, of the valve body 12. The segment seating surfaces 58 and 60 of the floating segments 32, 34 are inclined to sealingly engage the valve seats 20 and 22, respectively, of the valve body 12 when the expanding gate valve assembly 10 is in the closed position.

The floating segments 32 and 34 have wedging-camming surfaces 62 and 64, respectively, which mate with and co-act with the complementary matching wedging-camming surfaces 42 and 44, respectively, of the upper gate part 38 of the gate 28.

The upper portions of each of the floating segments 32, 34 form stop flanges 66, 68, respectively, which are shown abutted against the stop members 36 in FIG. 1. When the gate 28 is moved transverse to the fluid flow axis 40 toward the closing position, the stop flanges 66 and 68 on the floating segments 32, 34, respectively, make contact with the stop members 36, which remain stationary with the valve body 12. Upon further continued movement of the gate 28 in the same direction, the floating segments 32 and 34 cannot continue to move with the gate 28. At this time, the gate 28, in continuing to move transversely through the valve body 12, as shown in FIG. 1, causes the floating segments 32 and 34 to be wedged outwardly away from the axis of the gate 28. This results from the wedging of the wedging-camming surfaces 42 and 44 on the gate 28 against the corresponding wedging-camming surfaces 62 and 64 of the floating segments 32 and 34, respectively. The wedging of the floating segments 32 and 34 away from the gate 28 forces the floating segments 32, 34 to seal against the valve seats 20 and 22 in the valve body, a position of sealed closure of the expanding gate valve assembly 10.

When the expanding gate valve assembly 10 is operated to assume its open position as shown in FIG. 2, the stem member 30 is moved upwardly and away from the fluid flow axis 40. The inclined valve seats 20, 22 force the floating segments 32 and 34 to retract and collapse toward a nesting position within the recesses formed in the gate 28 as defined between the wedging-camming surfaces 42, 44 and the shoulders 54, 56 on the lower gate part 46 of the gate 28. This allows the gate-segment movement to proceed smoothly and evenly.

As the gate 28 continues its upward movement, the faces 50 and 52 of the lower gate part 46 remain parallel to and moving closer to the annular valve seats 20, 22 until such time the lower gate part 46 of the gate 28 becomes wedged against the inclined valve seats 20, 22. The fluid flow conduit 48 in the lower gate part 46 of the gate 28 becomes aligned with the fluid flow passageway 14 in the valve body 12, thereby disposing the expanding gate valve assembly 10 in its open position. In the open position, the lower gate part 46 of the gate 28 seals the fluid flow conduit 14 from the central cavity 16.

Tongue and groove subassemblies 70, one of which is shown in FIG. 2A, are provided between the floating segments 32, 34 and the upper gate part 38 of the gate 28 to slidably key these components together. The tongue and groove subassembly 70 comprises a tongue member 72 on the upstream face 42 of the upper gate part 38, and a corresponding groove 74 in the wedging-camming surface 62 of the floating segment 32. FIG. 2A, for purposes of illustration, depicts the upper gate part 38 and first floating segment 32 as separated, but it will be appreciated that the upstream face 42 and wedging-camming surface 62 are complementarily mated so that the tongue member 7 is slidably retained in the groove 74, the floating segment 32 thereby being slidably retained on the gate 28. It will be appreciated that there are numerous other ways by which a floating segment can be mounted onto the gate. For example, a toggle link between the segment and the gate is one. Still another manner of attachment is that of providing two pairs of wedging-camming surfaces spaced apart along the stem axis between the segment and the gate. (These alternative mounting attachments are not shown.)

The floating segments 32 and 34 can be provided conventional sealing rings or assemblies 80 set in grooves in the segment seating surfaces 58 and 60, respectively, as may be required in some applications for sealing integrity. It will be appreciated that multiple such sealing assemblies can be provided as backup sealants, and that such sealing assemblies can be provided on the valve seats 20 and 22, or on the faces 50, 52, in addition to, or in lieu of, the sealing assemblies 80 as shown.

FIG. 3 shows an alternative fluid sealing assembly 18A for the expanding gate valve assembly 10 which is identical to the fluid sealing assembly 18 except as noted. The alternative fluid sealing assembly 18A has a gate 28A that has a lower gate part 46A through which extends the through conduit or fluid flow bore 48. Disposed within the conduit 48 is an insert sleeve 82 the ends of which form the upstream and downstream seating surfaces 50, 52. A recess 84 is disposed on the outside of the insert sleeve 82, and a set screw 86 extends through a threaded bore in the lower gate part 46A so that its internal end extends into the recess 84 with a clearance fit to secure the insert sleeve 82 in the conduit 48 while permitting some movement along axis 87 of the conduit 48. Also, the recess 84 is dimensioned to have sufficient width to permit some rotational movement of the insert sleeve 82 about the axis 87. This limited freedom afforded to the insert sleeve 82 permits the sealing faces 50, 52 to move towards or away from the valve seats 20, 22 when the gate 28A is moved toward the open position of the valve, and the insert sleeve 82 can rotate about the fluid flow axis for proper seating. Such limited linear and rotational movement of the insert sleeve 82 eases the manufacturing tolerances somewhat to assure high sealing integrity. To this end, the sealing faces 50, 52 can be provided sealing ring assemblies 88 as indicated.

FIG. 4 shows a similar fluid sealing assembly 18B having gate 28B in which an upstream insert sleeve 90 and a downstream insert sleeve 92 are provided in the conduit 48 for limited linear and rotational movement thereof to better seat the sealing faces 50, 52 when the valve 10 is placed in its open position. Further, peripheral sealing assemblies 94 can be provided in appropriately positioned grooves to better seal about the insert sleeves 90, 92 as such is required for a particular application. The sleeves 90 and 92 can also be positioned and configured to be fluid pressure energized, and set screws (not shown) in recesses can be employed as in FIG. 3 for self-adjustment.

It will be clear that the present invention is well adapted to carry out the objects and attain the ends and advantages mentioned as well as those inherent therein. While presently preferred methods have been described for purposes of this disclosure, numerous changes may be made which will readily suggest themselves to those skilled in the art and which are encompassed passed in the spirit of the invention disclosed and as defined in the appended claims.

What is claimed is:

1. An expanding gate valve assembly comprising:
   a valve body defining a central cavity and having a fluid flow passageway therethrough intersecting the central cavity, the valve body comprising:
   a first inclined valve seat located on one side of the valve body, facing the central cavity and surrounding the fluid flow passageway;
   fluid sealing means for selectively closing and opening the fluid flow passageway, the fluid sealing means comprising:
   a gate movably mounted in the valve body for reciprocating movement in a direction transverse to the fluid flow passageway, the gate having a first gate side on one side thereof facing the first inclined valve seat on the valve body;
   valve actuating means for moving the gate to dispose the expanding gate valve alternatively in a valve open position and in a valve closed position, the valve actuating means having a stem attached to the gate and having a stem axis extending transverse to the axis of the fluid flow passageway;
   a first floating segment movably mounted on the gate on the first gate side, the first floating segment comprising:
   an inclined first wedging side facing the first inclined valve seat on the valve body and inclined to the stem axis at an acute angle, the first wedging side disposed to sealingly engage the first inclined valve seat to close the fluid flow passageway upon movement of the first floating segment away from the axis of the stem; and
   a second side facing the gate and complementarily configured to, and supported on, the first gate side so that when the gate is moved relative to the first floating segment in a first direction, the gate and the first floating segment expand so that the first floating segment is forced towards the first inclined valve seat on the valve body, and when the gate is moved relative to the first floating segment in the opposite second direction, the first floating segment is forced away by the taper on the first inclined valve seat towards the axis of the stem, and the first floating segment collapses toward a nesting position with the gate;
   stop means for arresting movement of the first floating segment while the gate continues to be moved in the first direction so that the first floating segment and the gate are caused to expand by the coaction of the complementarily configured gate and the first floating segment; and wherein the gate comprises:

a first gate part configured to cause the first floating segment to seal against the first inclined valve seat on the valve body to close the fluid flow passageway in the valve closed position when the first gate part extends across the fluid flow passageway;

a second gate part joined to the first gate part along the axis of the stem and having a fluid flow bore therethrough and being alignable and sealable with the first inclined valve seat along the fluid flow passageway in the valve open position; and seal means supported by the second gate part for sealing about the fluid flow passageway in the open position so that fluid is prevented from entering the central cavity of the valve body, the seal means comprising:

an insert sleeve supported in the fluid flow bore of the second gate part; and sealing ring means supported by the insert sleeve about the fluid flow passageway for sealingly contacting the first inclined valve seat in the open position.

2. The expanding gate valve of the claim 1 wherein the fluid sealing means is further characterized as having a tongue and groove subassembly between the first floating segment and the gate so that the first floating segment and the gate are slidably interconnected, the tongue and groove subassembly including a tongue member carried on one of the gate and first floating segment, and a groove provided in the other one of the gate and first floating segment.

3. The expanding gate valve assembly of claim 1 wherein the gate further comprises:

means for securing the insert sleeve in the fluid flow bore so that the insert sleeve has limited axial and rotational movement in the second gate part.

4. The expanding gate valve assembly of claim 1 wherein the valve body further comprises a second inclined valve seat on the valve body facing the central cavity and surrounding the fluid flow passageway, the second inclined valve seat oppositely inclined to the first inclined valve seat and wherein the gate has a second gate side on the opposite side thereof and facing the second inclined valve seat on the valve body, and the fluid sealing means further comprising:

a second floating segment movably mounted on the gate on the second gate side, the second floating segment comprising:

an inclined first wedging side facing the second inclined valve seat on the valve body and inclined to the stem axis at an acute angle, the first wedging side disposed to sealingly engage the second inclined valve seat to close the fluid flow passageway upon movement of the second floating segment away from the axis of the stem; and a second side facing the gate and complementarily configured to, and supported on, the second gate side so that when the gate is moved relative to the floating segment in a first direction, the gate and the second floating segment expand so that the second floating segment is wedged towards the second inclined valve seat on the valve body, and when the gate is moved relative to the second floating segment in the opposite second direction, the second floating segment is forced away by the taper on the second inclined valve seat towards the axis of the stem and the second floating segment collapses toward a nesting position with the gate; and stop means for arresting movement of the second floating segment while the gate continues to be moved in the first direction so that the second floating segment and the gate are caused to expand by the co-action of the complementarily configured gate and the second floating segment.

5. The expanding gate valve assembly of claim 4 wherein the fluid sealing means is further characterized as having a tongue and groove subassembly between the first floating segment and the gate and between the second floating segment and the gate so that the first and second floating segments and the gate are slidably interconnected, each tongue and groove subassembly including a tongue member carried on one of the gate and the respective floating segment, and a groove provided in the other one of the gate and the respective floating segment.

6. An expanding gate valve assembly comprising:

a valve body defining a central cavity and having a fluid flow passageway therethrough intersecting the central cavity, the valve body comprising:

a first inclined valve seat located on one side of the valve body, facing the central cavity and surrounding the fluid flow passageway;

fluid sealing means for selectively closing and opening the fluid flow passageway, the fluid sealing means comprising:

a gate movably mounted in the valve body for reciprocating movement in a direction transverse to the fluid flow passageway, the gate having a first gate side on one side thereof facing the first inclined valve seat on the valve body;

valve actuating means for moving the gate to dispose the expanding gate valve alternatively in a valve open position and in a valve closed position, the valve actuating means having a stem attached to the gate and having a stem axis extending transverse to the axis of the fluid flow passageway;

a first floating segment movably mounted on the gate on the first gate side, the first floating segment comprising:

an inclined first wedging side facing the first inclined valve seat on the valve body and inclined to the stem axis at an acute angle, the first wedging side disposed to sealingly engage the first inclined valve seat to close the fluid flow passageway upon movement of the first floating segment away from the axis of the stem; and a second side facing the gate and complementarily configured to, and supported on, the first gate side so that when the gate is moved relative to the first floating segment in a first direction, the gate and the first floating segment expand so that the first floating segment is wedged towards the first inclined valve seat on the valve body, and when the gate is moved relative to the first floating segment in the opposite second direction, the first floating segment is forced away by the taper on the first inclined valve seat towards the axis of the stem, and the first floating segment collapses toward a nesting position with the gate;

stop means for arresting movement of the first floating segment while the gate continues to be moved in the first direction so that the first floating segment and the gate are caused to expand by the coaction of the complementarily configured gate and the first floating segment; and wherein the gate comprises:

a first gate part configured to cause the first floating segment to seal against the first inclined valve seat on the valve body to close the fluid flow passageway in the valve closed position when the first gate part extends across the fluid flow passageway;

a second gate part joined to the first gate part along the axis of the stem and having a fluid flow bore therethrough and being alignable and sealable with the first inclined valve seat along the fluid flow passageway in the valve open position; and seal means supported by the second gate part for sealing about the fluid flow passageway in the open position so that fluid is prevented from entering the central cavity of the valve body, the seal means comprising:

an insert sleeve supported in the fluid flow bore of the second gate part;

sealing ring means supported by the insert sleeve about the fluid flow passageway for sealingly contacting the first inclined valve seat in the open position; and means for securing the insert sleeve in the fluid flow bore of the second gate part so that the insert sleeve has limited axial and rotational movement in the fluid flow bore.

* * * * *